US008386935B2

(12) United States Patent
van Zwol et al.

(10) Patent No.: US 8,386,935 B2
(45) Date of Patent: Feb. 26, 2013

(54) CONTENT SUMMARY AND SEGMENT CREATION

(75) Inventors: Roelof van Zwol, Catalunya (ES); Chris Theodore Kalaboukis, San Jose, CA (US); Lluis Garcia Pueyo, Barcelona (ES); Georgina Ramirez Camps, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 436 days.

(21) Appl. No.: 12/436,551

(22) Filed: May 6, 2009

(65) Prior Publication Data

US 2010/0287475 A1 Nov. 11, 2010

(51) Int. Cl.
*G06F 3/00* (2006.01)

(52) U.S. Cl. .......... 715/723; 715/783; 715/716; 725/45; 725/46

(58) Field of Classification Search .................... 715/723
See application file for complete search history.

(56) References Cited

U.S. PATENT DOCUMENTS

| 7,640,272 | B2 * | 12/2009 | Mahajan et al. ..................... 1/1 |
| 7,743,116 | B2 * | 6/2010 | Goldeen et al. ............... 709/219 |
| 7,743,399 | B1 * | 6/2010 | Bhagavath et al. ............. 725/94 |
| 7,823,066 | B1 * | 10/2010 | Kuramura ..................... 715/717 |
| 2003/0221196 | A1 * | 11/2003 | Connelly ..................... 725/110 |
| 2005/0003330 | A1 * | 1/2005 | Asgarinejad et al. ........... 434/20 |
| 2006/0026524 | A1 * | 2/2006 | Ma et al. ..................... 715/713 |
| 2006/0236342 | A1 * | 10/2006 | Kunkel et al. ................... 725/52 |
| 2007/0118873 | A1 * | 5/2007 | Houh et al. ..................... 725/136 |
| 2007/0156739 | A1 * | 7/2007 | Black et al. ................... 707/102 |
| 2008/0052739 | A1 * | 2/2008 | Logan ............................ 725/25 |
| 2008/0086747 | A1 * | 4/2008 | Rasanen et al. ................ 725/46 |
| 2008/0140385 | A1 * | 6/2008 | Mahajan et al. ................... 704/9 |
| 2009/0080853 | A1 * | 3/2009 | Chen et al. ..................... 386/52 |
| 2009/0093278 | A1 * | 4/2009 | Negron et al. ................ 455/567 |
| 2009/0132921 | A1 * | 5/2009 | Hwangbo et al. ............. 715/716 |
| 2009/0158157 | A1 * | 6/2009 | Shields et al. ................ 715/723 |
| 2009/0158323 | A1 * | 6/2009 | Bober et al. ..................... 725/37 |
| 2009/0208180 | A1 * | 8/2009 | Ashby et al. ..................... 386/52 |
| 2010/0050080 | A1 * | 2/2010 | Libert et al. .................. 715/716 |
| 2010/0169347 | A1 * | 7/2010 | Dasher .......................... 707/758 |
| 2010/0169786 | A1 * | 7/2010 | O'Brien et al. ............... 715/738 |
| 2010/0169977 | A1 * | 7/2010 | Dasher et al. ................... 726/26 |
| 2010/0242072 | A1 * | 9/2010 | Bhagavath et al. ............. 725/94 |
| 2010/0262911 | A1 * | 10/2010 | Kaplan et al. ................. 715/719 |

* cited by examiner

*Primary Examiner* — William Bashore
*Assistant Examiner* — Reza Nabi
(74) *Attorney, Agent, or Firm* — Greenberg Traurig, LLP

(57) ABSTRACT

Disclosed herein is an ability to create segments of content, such as video, audio, multimedia, image, animation, interactive, etc. content, to associate metadata to each segment created, and to generate a summary of content comprising one or more segments using the metadata associated with the content segments. One or more acticons represented as icons in a user interface displayable to a user can be used to indicate a starting and/or ending point for a content segment. An acticon can represent an occurrence in the content, or a reaction of a user experiencing the content, for example.

37 Claims, 9 Drawing Sheets

CONTENT SUMMARY AND SEGMENT CREATION

FIELD OF THE DISCLOSURE

This disclosure relates to content summary and segment creation, and more particularly to creating segments of content, each segment having associated metadata, and to creating a summary of the content from one or more of the content segments using the associated metadata.

BACKGROUND

Content, e.g., multimedia, audio, video, image, animation, interactive, etc. content, has increasingly become more accessible to users. In addition, the amount of video that is accessible has increased. By way of a non-limiting example, the amount of video content that is accessible by a user via the internet, or other computer network, has increased. While a user may only be interested in a portion of a video, the user is forced to view an entire video, which may be quite long, in order to view the portion that may be of interest to the user.

SUMMARY

The present disclosure seeks to address failings in the art and to provide an ability to create segments of content, such as video, audio, multimedia, image, animation, interactive, etc. content, to associate metadata to each segment created, and to generate a summary of content comprising one or more segments.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium. In accordance with one or more embodiments, the computer-readable medium comprises a medium that tangibly stores program code, and/or process steps, thereon.

In at least one embodiment, a method is provided, the method comprises receiving input indicative of a starting point for a segment of content, the content comprising content that is currently selected for playback by a media player; receiving input indicative of an ending point for the segment of content; collecting, by at least one processing unit, information as metadata to be associated with the segment of content, the metadata comprising at least one content summary selection property and including the starting point and the ending point of the segment of content.

In accordance with one or more embodiments, a computer-readable medium is provided, the medium tangibly storing thereon computer-executable process steps, the process steps comprising receiving input indicative of a starting point for a segment of content, the content comprising content that is currently selected for playback by a media player; receiving input indicative of an ending point for the segment of content; collecting, by at least one processing unit, information as metadata to be associated with the segment of content, the metadata comprising at least one content summary selection property and including the starting point and the ending point of the segment of content.

In accordance with one or more embodiments a system comprising at least one computing device having a processing unit is provided, the processing unit is configured to receive input indicative of a starting point for a segment of content, the content comprising content that is currently selected for playback by a media player; receive input indicative of an ending point for the segment of content; collect, by at least one processing unit, information as metadata to be associated with the segment of content, the metadata comprising at least one content summary selection property and including the starting point and the ending point of the segment of content.

In accordance with one or more embodiments, user interface is provided, the user interface comprising a media player portion to playback content; a content segment portion to display information associated with a segment of the content; a content search portion comprising a search input section and a search results display portion, the search input section for entering search criteria to search a store for content satisfying search criteria and the search results display portion for displaying results of the search; and a content segment list portion comprising one or more entries, each entry corresponding to a content segment.

DRAWINGS

The above-mentioned features and objects of the present disclosure will become more apparent with reference to the following description taken in conjunction with the accompanying drawings wherein like reference numerals denote like elements and in which:

FIG. 1, which comprises FIGS. 1A and 1B, is illustrative of processes used in accordance with one or more embodiments of the present disclosure.

FIG. 2 provides an example of a GUI for use in accordance with one or more embodiments of the present disclosure.

FIG. 3 provides an example of an entry in a content segment list for use in accordance with one or more embodiments of the present disclosure.

FIG. 4 provides an example of a display portion of a GUI which has different video controls for content and a summary of the content in accordance with one or more embodiments of the present disclosure.

FIG. 5 provides an example of a segment creation process flow for use in accordance with one or more embodiments of the present disclosure.

FIG. 6 provides an example of a summary creation process flow for use in accordance with one or more embodiments of the present disclosure.

FIG. 7 provides an example of content summary presentation in accordance with one or more embodiments of the present disclosure.

DETAILED DESCRIPTION

Figure 1A:
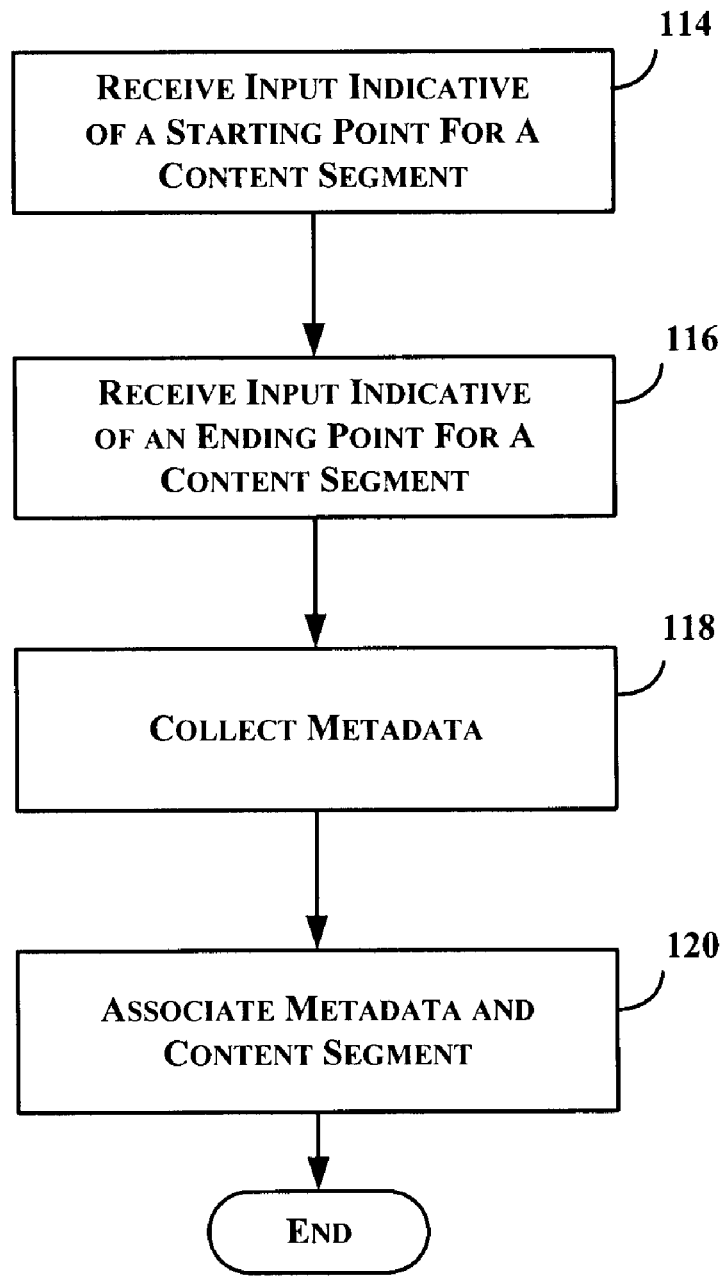

Certain embodiments of the present disclosure will now be discussed with reference to the aforementioned figures, wherein like reference numerals refer to like components.

Figure 1B:
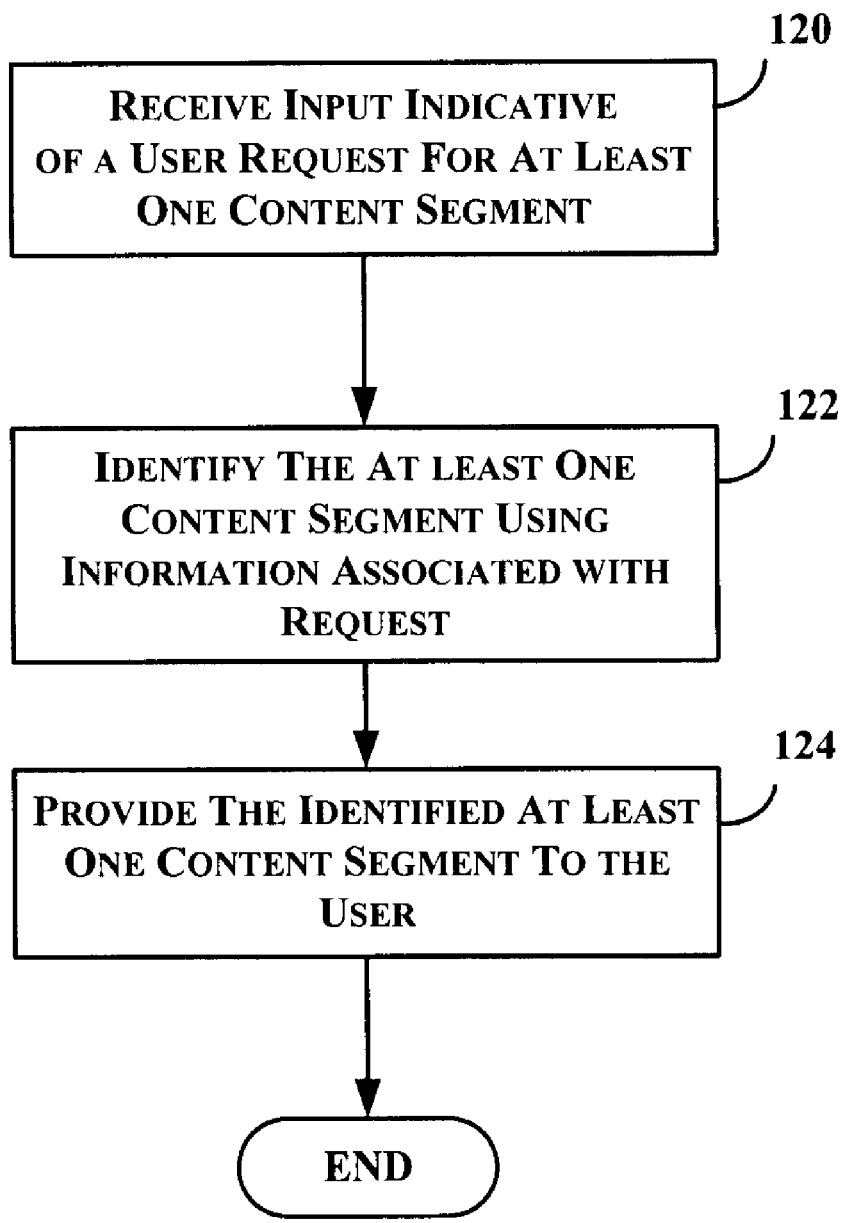

In general, the present disclosure includes a system, apparatus, method and architecture to create segments of content, such as video, audio, multimedia, image, animation, interactive, etc. content, to associate metadata to each segment created, and to generate a summary of content comprising one or more content segments. FIG. 1, which comprises FIGS. 1A and 1B, is illustrative of processes used in accordance with one or more embodiments of the present disclosure.

In accordance with one or more embodiments, a content segment is defined by starting and end points within a larger content item. By way of some non-limiting examples, a content segment's starting point can coincide with, or occur after, the larger content item's starting point, and the content segment's ending point can coincide with, or occur before, the larger content item's ending point. In accordance with one or more such embodiments, one or both of the starting and ending points can be identified using input received from a user. Alternatively, a starting point and/or ending point can be determined otherwise, e.g., based on components of the content itself, such as an image, or images, found in video content, or a sound, or sounds, found in audio content, for example. FIG. 1A provides an overview of a process to create a content segment in accordance with an embodiment of the present disclosure. By way of a non-limiting example, the process can be used to create a video segment from video content. By way of some further non-limiting examples, the process can be used to create an audio segment from audio content, a multimedia content segment can be created from multimedia content, and animation segment can be created from an animation, etc.

At step 114, input indicative of a starting point of the content segment is received. By way of a non-limiting example, a user can be experiencing, e.g., playing back, content using a media player, e.g., Windows Media® player available from Microsoft®, QuickTime® media player from Apple®, etc., and input can be received via any input device, such as a mouse, keyboard, microphone, touch pad, etc. In accordance with one or more embodiments, a starting and/or ending point corresponds to a point during playback of the content that corresponds to a timing of the input from the user.

At step 116, input indicative of an ending point for the content segment is received. The manner used to receive input indicative of the ending point can be the same as that used to receive input indicative of the starting point. Thus, for example, mouse input can be received to indicate both a starting point and ending point. Alternatively, the manner by which the ending point is identified by a user can be different from the manner used to indicate a starting point of the content segment. By way of a non-limiting example, a user might use a pointing device to mark a segment's starting point and a microphone to mark the segment's ending point.

At step 118, information is collected about the content segment. In accordance with one or more embodiments, the information, which is referred to collectively as metadata, is associated with the content segment at step 120. By way of some non-limiting examples, the metadata can include information identifying the content from which the content segment is created, the starting and ending points within the original content item, information about the user that creates the content segment, a description of the content segment, comments concerning the content segment, keyword(s), etc. In accordance with one or more embodiments, the metadata associated with a content segment comprises items of information, each of which can be a property used in content segment selection to determine whether or not to select the associated content segment for inclusion in a content summary.

In accordance with one or more embodiments, the metadata can include information identifying one or more "acticons." In accordance with one or more such embodiments, an acticon refers to a visual component of a GUI and represents information that can be associated with, or related to, the content segment. In accordance with one or more embodiments, an acticon can be created, e.g., predefined and/or dynamically defined, e.g., defined by a user or the system, and published so that any number of users can use the acticon. An acticon can be associated with a given domain, e.g., genre, content type, etc. Conversely, an acticon can be associated with more than one domain or can have universal application, e.g., for use across domains.

By way of some non-limiting examples, an acticon can be represented as a graphic image, e.g., an icon, in a display of a graphical user interface (GUI) that includes the media player that is used to play content. In accordance with one or more embodiments, an acticon represents information, or metadata, that can be associated with a content segment. In accordance with one or more embodiments, an acticon can represent an action that occurs in the content, and/or an action that can be applied to the content. By way of a further non-limiting example, if the content is video content of a soccer match, exemplary acticons could be images representing a yellow card, a red card, a goal, a referee whistle, etc. Other non-limiting examples of acticons include those that represent a user reaction to content, such as an emotion, or sentiment or feeling, that a user might experience while experiencing the content, e.g., while the content is being played, such as acticons comprising one or more symbols of approval, e.g., an "OK" sign, happiness, e.g., a smile or laughter, sadness, e.g., tears, as well as other emotions.

In accordance with one or more embodiments, a plurality of acticons can be displayed as the content is being displayed, so that the user can press any of the plurality of acticons while experiencing the content. In accordance with the one or more embodiments, selection of an acticon can be used to identify a content segment's starting or ending point, and to associate the information represented by the acticon with the content, e.g., a content segment, that is being experienced at a time that the acticon is selected. Input comprising information to be used as metadata, e.g., information represented by an acticon, and the timing of the selection of the acticon, as either the starting or ending point of a content segment, can be received simultaneously and associated with the content segment. By way of a non-limiting example, a user watching a soccer match can press a "yellow card" acticon when the user sees the referee using a yellow card in the soccer match, thereby linking the "yellow card" acticon to a point in the video content of the soccer match at which the referee shown the yellow card.

In accordance with one or more embodiments, other information in addition to user identification, user ID, can be associated with a content segment. By way of some non-limiting examples, affiliation, such as an affiliation with a political party, social organization, employer, etc., demographic information, such as gender, age, income level, race, religion, etc., geographic information, such as residence address, purchasing history, content preferences, etc.

FIG. 1B provides an overview of a process to identify one or more content segments in accordance with one or more embodiments of the present disclosure. In accordance with one or more embodiments, the process shown in FIG. 1B can be used to generate a summary of content, which summary can comprise one or more content segments created in accordance with a content segment creation process such as that shown in FIG. 1A.

At step 120, input indicative of the user's request for at least one content segment is received. At step 122, at least one content segment is identified using information associated with the request, which can include information associated with the requesting user, a desired length of the summary, etc. By way of a non-limiting example, information associated with the request can be compared with information associated with a content segment to identify whether or not the content segment should be selected for the user. By way of a further non-limiting example, the requester can provide criteria for selecting, or identifying, the one or more content segments. As yet another alternative, information about the user and selection criteria provided by the user can be used to identify the one or more content segments. At step 124, the identified at least one content segment is provided to the user.

Figure 2:
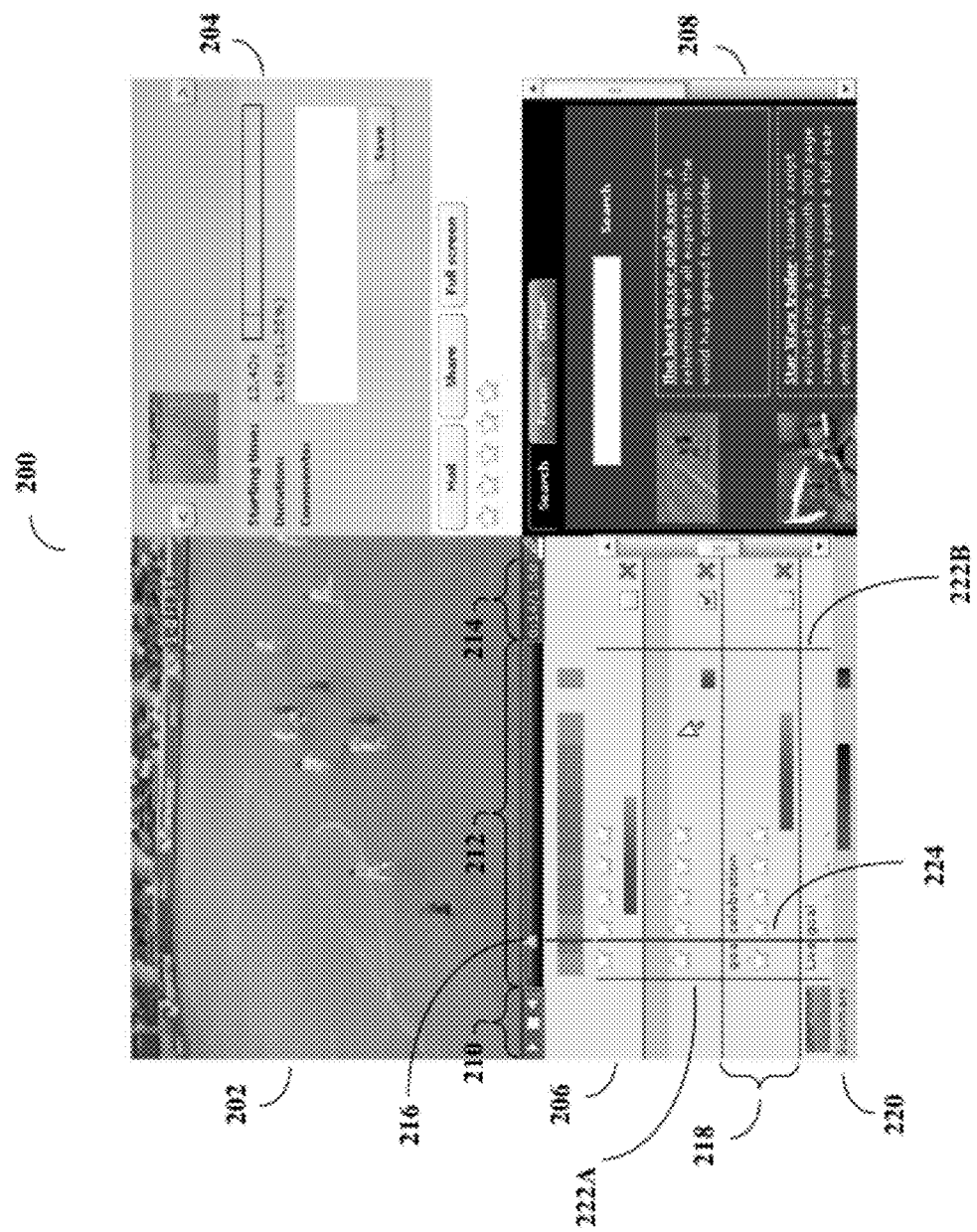

In accordance with one or more embodiments, a GUI can be used to play content, receive content segment creation input and/or receive content segment, and/or content summary, requests. FIG. 2 provides an example of a GUI for use in accordance with one or more embodiments of the present disclosure. In the example shown in FIG. 2, GUI 200 comprises a media player portion 202, a content segment portion 204, a content segment list portion 206, and a content search portion 208. Media player portion 202 can be used to display a visual component of the content. By way of a non-limiting example, media player portion 202 can be generated by a media player, which can be used to generate an audio component of the content as well. In the example of FIG. 2, the media player portion 202 includes playback controls, e.g., play, pause, volume, seek, etc. In the example shown, seek control 216 is used in a playback timeline 212 to show a current play back location in the playback timeline. In addition, seek control 216 can be used to access a particular point in the playback timeline, e.g., by dragging the seek control 216 to a point in the playback timeline. Numeric readout portion 214 provides a numeric time readout for the playback, e.g., an amount of time expended, which is shown to the left of the forward slash, and a total playback time, which is shown to the right of the forward slash. The numeric time readout can be provided in any unit of time, e.g., seconds, minutes, hours, etc.

In accordance with one or more embodiments, the content segment list portion 206 provides a listing of content segments. Each entry in the list corresponds to a content segment selectable for inclusion in a content segment. In accordance with one or more embodiments, the list of content segments can be provided in response to a search for content segments, e.g., a search conducted by the system in response to a request for content segments or a request for content segments to be used to generate a content summary. In accordance with one or more embodiments, the list of content segments can correspond to content listed and selected from the content search portion 208.

Figure 3:
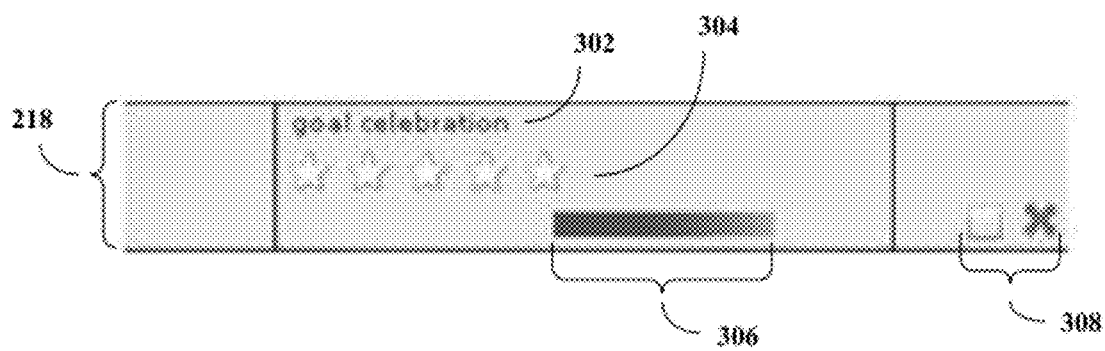

FIG. 3 illustrates one of the entries in the content segment list of FIG. 2 in accordance with one or more embodiments of the present disclosure. By way of a non-limiting example and as shown in FIG. 3, an entry in the list, e.g., entry 218 shown in FIGS. 2 and 3, can include, among other things, a title 302, rating 304, e.g., a rating from one to five stars, timeline 306, and one or more selection indicators 308. The rating can be determined based on an expressed rating provided by one or more users, or can be generated information collected for the content segment. By way of some non-limiting examples, a rating can be generated by observing behavior of users in connection with the content segment, such as the number of times that the content segment is played, replayed and/or skipped, changes in volume, playback speed, etc.

In accordance with one or more embodiments, each entry in the content segment list portion 206 comprises selection indicators 308, which can be used to select, or deselect, an entry in the list for inclusion in a content summary. By way of a non-limiting example, the selection indicators include a check box, and an entry can be selected for inclusion in a content summary in a case that a check is detected in the check box. By way of a further non-limiting example, an "X" icon included in the selection indicators 308 can be used to deselect an entry, e.g., to remove a previously-selected entry from a content summary, and/or to remove an entry from the content segment list portion 206. Content segment list portion 206 includes a scrollbar, or other mechanism, to scroll through the list to view entries, e.g., entries that are not displayed, in the list.

In accordance with one or more embodiments, timeline 306 represents a timeline of the content segment corresponding to the list entry. Referring to FIG. 2, markings 222A and 222B correspond to the start and end, respectively, of timeline 212 of the content that includes one or more content segments, e.g., the content segments listed in content segment list portion 206, and marking 224 corresponds to the current position of seek control 216 in timeline 212, e.g., the current playback position. By way of a non-limiting example, markings 222A, 222B, 224 and 306 provide a visual image of a content segment's position relative to the start and end of content that includes the content segment and the content segment's position relative to the current playback position. By way of a further non-limiting example, the positioning of a content segment's timeline, e.g., timeline 306, in the content segment's entry, e.g., entry 218, in the content segment listing portion 206, is relative to the content's timeline 212, and represents the portion of the timeline 212 that corresponds to the content segment.

Referring again to FIG. 2, content segment portion 204 displays information about a content segment. By way of a non-limiting example, content segment portion 204 can display information about an existing content segment or a new content segment. In accordance with one or more embodiments, a user can indicate a start, or an end, of a new content segment, e.g., using a mouse or other pointing device within media player portion 202, and content segment portion 204 can identify a starting time for the content segment, e.g., a time corresponding to a point specified by the user, a duration specified in units of time and/or a percentage of a playback time, e.g., the playback time of the content which includes the new content segment, and any comments the user wishes to make about the new content segment. By way of a non-limiting example, a content segment's duration can be measured in units of time, and can be determined from the times associated with the content segment's starting and ending points. A "Save" button in content segment portion 204 allows the user to save the new content segment. Content segment portion of the 204 can include a rating portion, as well as buttons to send the content segment via e-mail to one or more recipients, to share the content segment with other users, and/or to display the content segment in full screen mode.

In accordance with one or more embodiments, content segment portion 204 can display information about an existing content segment. By way of a non-limiting example, comments associated with a content segment can be displayed in the comments section of portion 204. The user can update and/or add comments to be associated with a content segment using the comments section of portion 204. In accordance with one or more embodiments, a user can add a rating for a new or existing content segment using content segment portion 204. Information input via content segment portion 204 can be considered, together with any of the metadata associated with the content segment, to determine whether or not to select the content segment for a content summary.

Content search portion 208 includes a search capability, which is provided by selecting a search tab, to search for content, e.g., one or more existing content summaries, each of which comprising one or more content segments. The user can scroll through a listing of content and select one of the entries in the list to view the content corresponding to the entry. The user can access one or more forums, e.g., discussion forums, using the forum tab.

Figure 4:
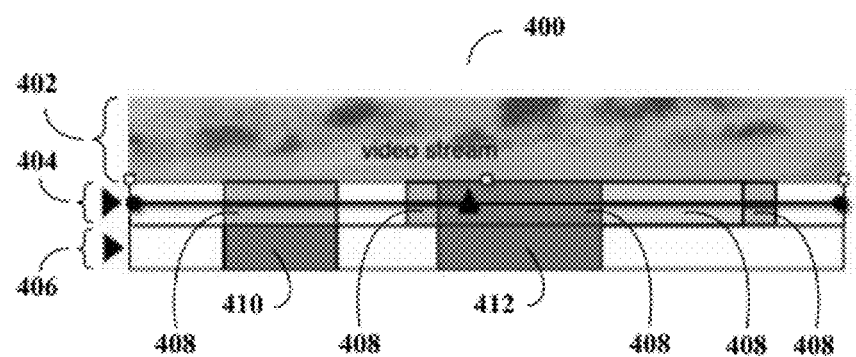

In the example FIG. 2, video controls 210, timeline 212, and/or numeric readout 214 are used for both content and a summary of the content. In accordance with one or more embodiments, different video controls, timeline, and/or numeric readout can be used for the content and a summary of the contents. FIG. 4 provides an example of a display portion 400 of a GUI which has different video controls for content and a summary of the content in accordance with one or more embodiments of the present disclosure. In the example of FIG. 4, a single timeline and seek control are used. Alternatively and although not shown, a different timeline and seek control can be used. In addition, in the example of FIG. 4, separate playback controls 404 and 406 are used, such that playback controls 404 are used to control playback of video stream content 402 and playback controls 406 are used to control playback of a content summary. A number of video content segments 408 exist for video stream content 402. By way of a non-limiting example, content segments 408 may have been created by designating start and stop points during playback of video content stream 402, by clicking a mouse button or selecting an acticon. In accordance with one or more embodiments, a video content segment 408 can be created based on a determined level of user attention paid to, or user popularity of, a portion of the video content stream 402. By way of a further non-limiting example, playback of video content stream 402 can be tracked in order to determine a level of user attention paid to a given segment of video content stream 402, e.g., a number of users that played a given segment of video content stream 402 and/or an amount of time that the segment was played can be collected, and a segment can be defined based on the information collected. Two of the video content segments 408, referenced as 410 and 412 are selected as part of video content summary, which can be controlled by video controls 406.

In accordance with one or more embodiments, different content segments having overlapping portions can be combined to create a single content segment. In accordance with one or more embodiments, the metadata associated with the overlapping content segments used to create the single content segment is associated with the new content segment. By way of a non-limiting example, in a case that the content segments have different lengths, the length of the new content segment can be determined to be the length of the longest content segment used to create the new content segment, the length of the shortest content segment used to create the new content segment, or some other length, which can be determined to accommodate a content summary, e.g., a desired length of the content summary. By way of some further non-limiting examples, the length of the new content segment can be determined based on an analysis of the starting and ending points of the content segments used to create the new content segment, and/or an analysis of the content itself. By way of yet another non-limiting example, a starting point, or ending point, of the new content segment can be determined by identifying a point where a majority of the content segments start, or end, and determining a point of consensus for the starting, or ending, point.

In accordance with one or more embodiments, content segments can be created by more than one user, and a content summary can comprise content segments created by different users, e.g., a content summary can comprise content segments generated by multiple users. Furthermore and in accordance with one or more embodiments, different content summaries can be created, so that a content summary created for one user is different from a content summary created for another user. In accordance with one or more such embodiments, different criteria can be used to create different content summaries, e.g., desired length, user interest(s) and/or preferences, etc.

Figure 5:
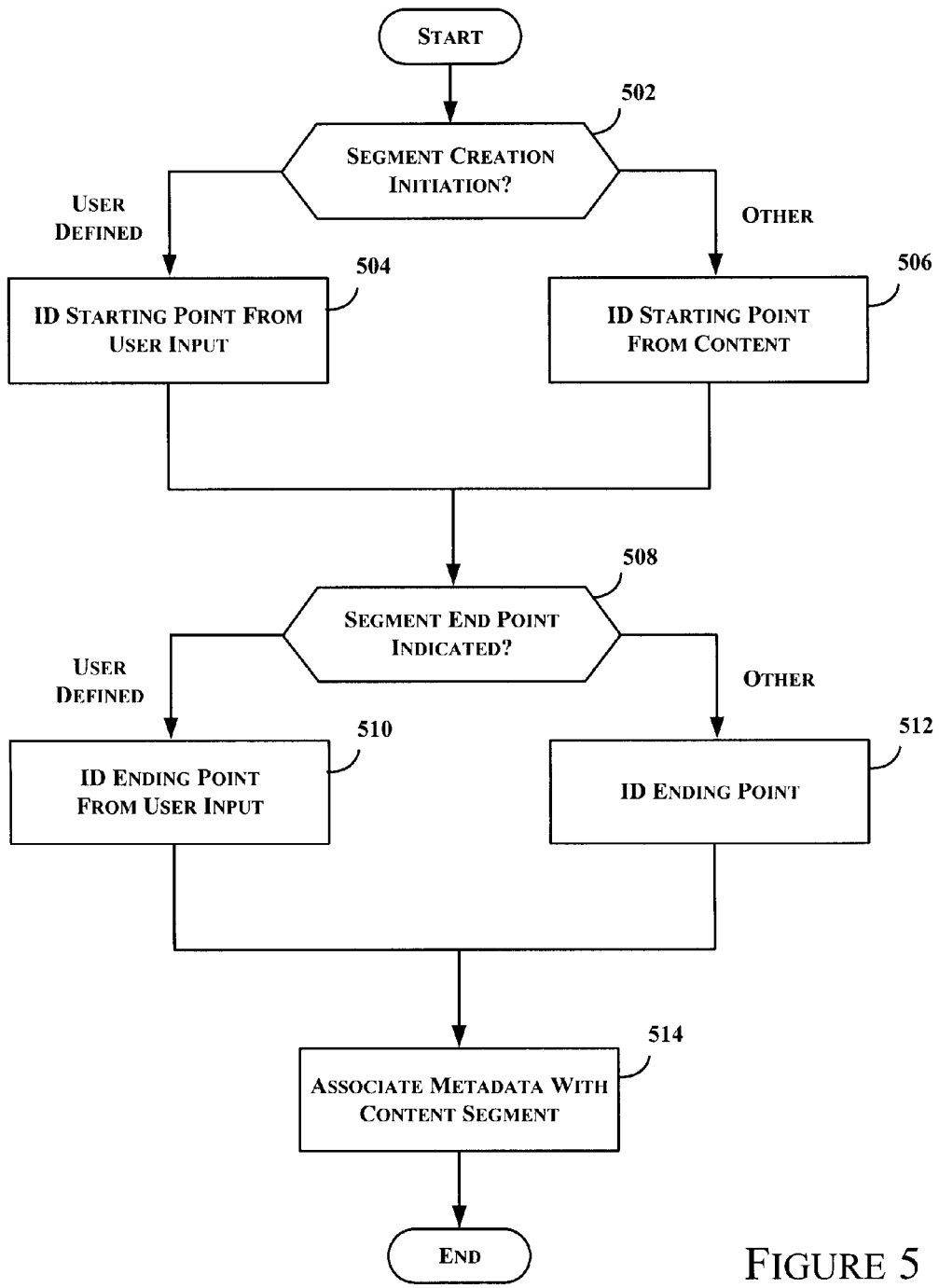

In accordance with one or more embodiments, a user can create a content segment. Alternatively, a content segment can be created in response to indicators other than user input. By way of some non-limiting examples, a content segment can be created based on the content FIG. 5 provides an example of a segment creation process flow for use in accordance with one or more embodiments of the present disclosure. At step 502, a determination is made whether or not a segment creation request is initiated. By way of a non-limiting example, segment creation can be initiated by the user, e.g., by clicking on the mouse button, selecting an acticon, audible command, etc., or by the system, e.g., based on characteristics of the content, e.g., audible indicator such as crowd noise during a sporting event, visual indicator such as an image, scene, etc. By way of a further non-limiting example, a content segment can be created as an aggregate of more than one content segment, as is discussed in more detail below. If it is determined at step number 502 that the segment creation is initiated in response to user input, processing continues at step 504 to identify the starting point in the content for the content segment. As discussed above, the starting point can be expressed in units of time, e.g., relative to a starting time, such as zero minutes, zero seconds for the content from which the content segment is generated. It should be apparent that another unit of measure can be used, however. By way of another non-limiting example, a starting, or ending, point can be expressed in terms of a content frame, or some unit that is based on a frame, e.g., sub-frame. It should also be apparent that a combination of units of measure can be used to identify a starting point and/or an ending point for the content and/or a segment of the content. By way of yet another non-limiting example, a starting point, ending point, or both the starting and ending points, can be determined using an initial point adjusted by an amount of "padding." In a case that an initial point is measured in units of time, an amount of time can be added or subtracted from the initial point to arrive at the starting point, or ending point.

Processing continues from step 504 or 506 to step 508, at which a determination is made whether input indicative of the segment's endpoint is received. In the case that the ending point is indicated from user input, processing continues at step 510 to identify the ending point using the user input. In a case that the indicator of the ending point is other than by user input, processing continues at step 512 to identify the ending point using the other indicator, e.g., the content itself. In either case, processing continues at step 514 to identify any metadata that is to be associated with the content segment, and to associate the identified metadata to the content segment. Processing then ends for the current segment creation.

Figure 6:
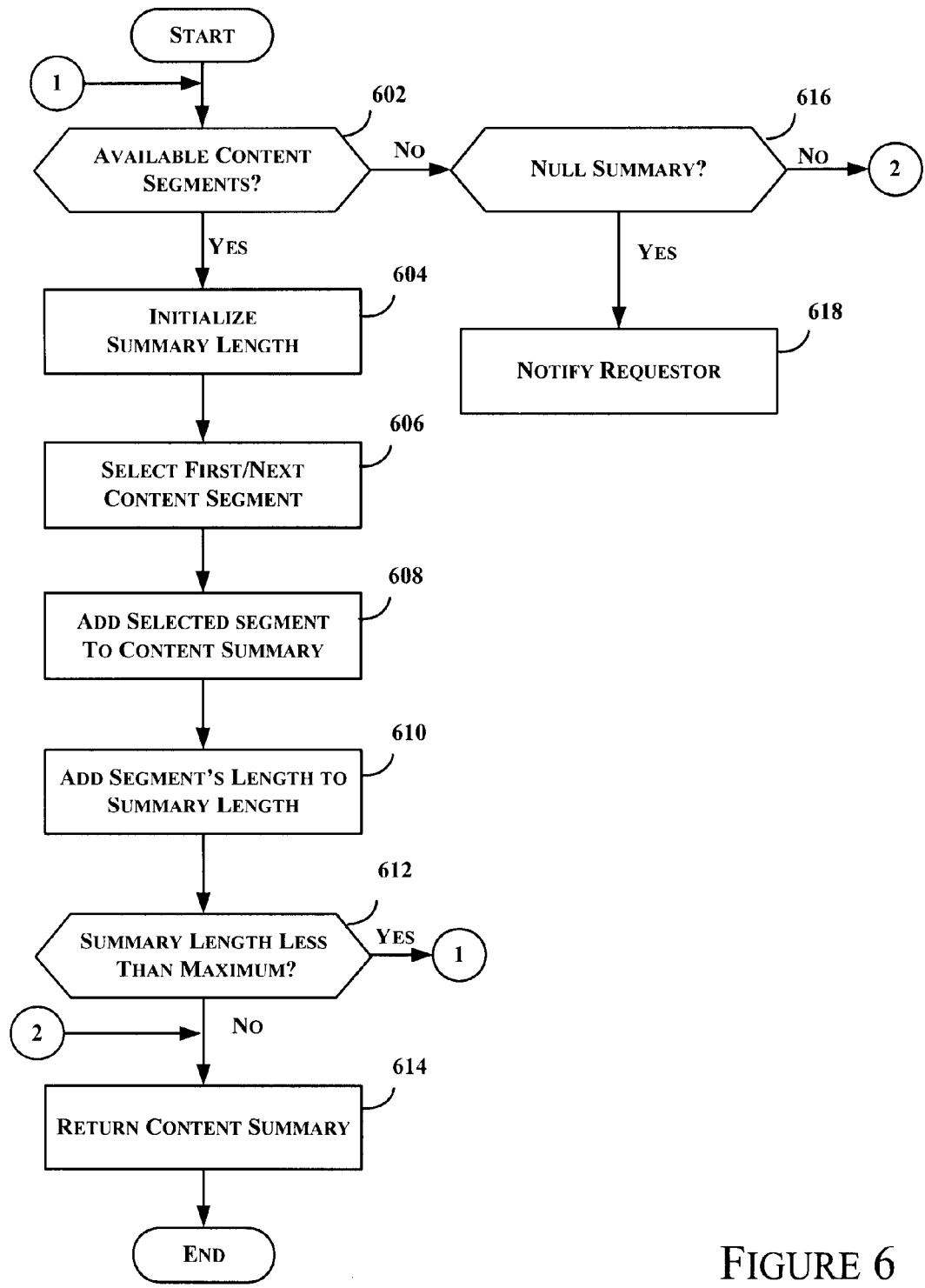

FIG. 6 provides an example of a summary creation process flow for use in accordance with one or more embodiments of the present disclosure. By way of a non-limiting example, the process flow can be executed in response to a request by a user for a summary of one or more content items. At step 602, a determination is made whether or not there are any existing content segments, from which a content summary can be generated. If not, processing continues at step 616 to make a determination whether or not the content summary comprises any content segments. If the content summary is null, i.e., no content segments are available and/or none were selected, for inclusion in the content summary, processing continues at step 618 to notify the requesting user. By way of a non-limiting example, the user can be given the option to experience the full content, or request a content summary for different content.

If it is determined at step 602 that at least one content segment is available, processing continues at step 604 to initialize the content summary length, e.g., to zero. At step 606, a first, or next, content segment to be included in the content summary is selected from the available content segment(s). By way of a non-limiting example, a content segment can be selected based on one or more of the content segment's length, popularity of the content segment, a comparison of information known about the user and information associated with the content segment, content segments previously selected for the content summary, etc. By way of a further non-limiting example, a content segment's popularity can be determined based on the number of viewings by users of the content segment, and/or an amount of the content segment that is included in other content segments. In accordance with one or more embodiments, a content segment can be dynamically generated as an aggregate of multiple content segments that share at least a portion of the same content. By way of a non-limiting example, the aggregate can comprise a common portion shared by the content segments used to generate the aggregate. By way of a further non-limiting example, the length of the common portion can be determined based on a desired length of the content summary, to which the aggregate is to be added. By way of yet another non-limiting example, as discussed herein, an initial starting point and/or initial ending point of the aggregate can be padded, e.g., using content before an initial starting point and/or using content after an initial ending point, to determine a starting point and/or ending point for the aggregate content segment.

At step 608, the selected segment of content is added to the content summary. By way of some non-limiting examples, the selected segment can be physically incorporated into a content summary, or identified in a list, e.g., as an entry in a play list that points to the selected segment, of content segments identified for the content summary, or some combination thereof. At step 610, the length of the selected content segment is added to a current length of the content summary, e.g., which current length can be an aggregate of the lengths of the content segments previously selected for the content summary, to include the length of the selected content segment in the current length of the content summary. At step 612, a determination is made whether the length of the content summary is less than the maximum length for the summary. By way of some non-limiting examples, a maximum length can be set by the user requesting the content summary, set as the default value, e.g., some percentage of the length of the content being summarized, set based on network transmission capacity(ies), set based on user computing device capacity(ies), set in accordance with a maximum length set by a system to which the content summary is to be posted, etc.

If it is determined at step 612 that the current length of the content summary is at least equal to the maximum, processing continues at step 614 to return the content summary, and processing ends for the current content summary request. If it is determined at step 612 that the current length of the content summary is less than the maximum, processing continues at step 602 to determine whether or not there are any remaining available content segments. In a case that the length of the content summary exceeds the maximum length, the length of the content summary can be modified by removing the last content segment added in favor or a shorter content segment, shortening one or more of the content segments included in the content summary, etc.

In the process flow example, step 602 is performed initially and before any content segment is selected for the content summary and after a content segment is selected for the content summary. Accordingly, a determination at step 602 that there are no content segments available for selection can occur in a case that all of the available content segments have been selected for the content summary or in a case that the content summary has not reached its maximum length and there are no more content segments that can be used to add to the content segment. At step 616, a determination can be made to differentiate between these circumstances, e.g., so that the user can be notified. In such a case, the user can be given an opportunity to view some or all of the content, to have a content summary generated dynamically, e.g., based on an analysis of the content to search for interesting portions of the content, etc. If the content summary is not null, i.e., at least one content segment is selected for the content summary, processing continues at step 614 to return a content summary.

A non-limiting example of a specific application of one or more embodiments involves a user that wishes to view a summary of multimedia content comprising one or more presidential debates in which a number of presidential candidates are participants. Embodiments of the present disclosure can be used to create segments of content and to generate the content summary. Segments of the content can be created by users or automatically created based on an analysis of the content itself, e.g., an analysis of the audio and or video content to identify segments including a particular candidate, moderator, commentator, etc., and/or an analysis of other information associated with the content, such as reaction provided by debate viewers. Information, such as the requesting user's party affiliation, the party affiliation of each of the users that created content segments, the party affiliation of each of the debaters, viewer reaction information, etc. associated with content segments can be used to select content segments for the content summary.

Figure 7:
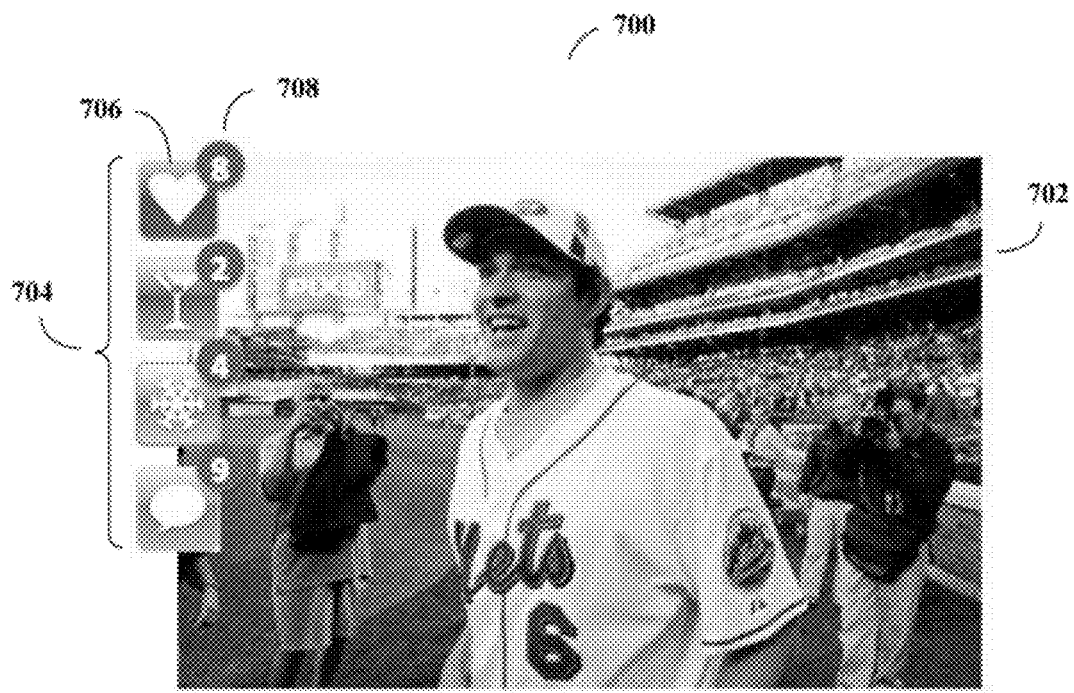

FIG. 7 provides an example of a content summary presentation in accordance with one or more embodiments of the present disclosure. In accordance with one or more embodiments, one or more acticons associated with content segments selected for a content summary can be output as the content summary is output. By way of a non-limiting example, in a case that the content summary includes video content, the one or more acticons can be displayed as the video content is displayed. In the example of FIG. 7, display 700 includes a portion, e.g., a frame 702, of a content summary, which summary includes video content and which can be generated in accordance with one or more embodiments disclosed herein. In accordance with one or more embodiments, in addition to frame 702, display 700 includes acticon display 704, which can be used to display an acticon, or acticons, associated with frame 702. In the example of FIG. 7, acticon display 704 includes a number of acticons arranged in a vertical orientation. In accordance with one or more embodiments, at least a portion of acticon display 704 overlays at least a portion of the display of frame 702. It should be apparent, however, that acticon display 704 can be otherwise positioned, and/or arranged using another orientation. By way of some further non-limiting examples, the acticons in acticon display 704 can be arranged in a horizontal orientation and acticon display 704 can be positioned above or below frame 702, with or without at least a portion of acticon display 704 overlaying a portion of frame 702. By way of another non-limiting example, acticon display 704 can be arranged in a vertical orientation, as shown in FIG. 7, and be positioned to the right of frame 702, with or without at least a portion of acticon display 704 overlaying a portion of frame 702.

In accordance with one or more embodiments, as shown in the example of FIG. 7, each acticon 706 in acticon display 704 includes a frequency 708, which identifies the number of times that acticon 706 is associated with frame 702, and/or with a content segment including frame 702 selected for the content summary. By way of a non-limiting example, frame 702 can be included in a number of content segments, and each segment can be associated with one or more acticons. The acticons associated with content segments, e.g., overlapping content segments, which include frame 702 can be identified, and a count of the number of occurrences of each acticon associated with the content segments can be determined and displayed as frequency 708 in display 700. In accordance with one or more embodiments, acticon display 704 can provide a summary of the associated acticons. In accordance with one or more such emebodiments, the acticon summary can include frequency 708 for each acticon in the summary. By way of a non-limiting example, the frequency 708 used in an acticon summary can be a, count, e.g., a number of associations of the acticon with the frame 702 and/or the content segment that includes frame 702, as discussed above. By way of some further non-limiting examples, acticon display 704 may show a number of the most frequently used acticons, such as those acticons that are determined to have a frequency that satisfies a threshold frequency. Frequency 708 can also be used in the display of the most frequently used acticons.

In accordance with one or more embodiments, the contents of acticon display 704 are synchronized with the playback of a content summary and the metadata associated with the content segments selected for the content summary. By way of some non-limiting examples, the acticons displayed in acticon display 704 and/or the frequency 708 corresponding to each acticon displayed in acticon display 704 changes as the content summary is playing.

Figure 8:
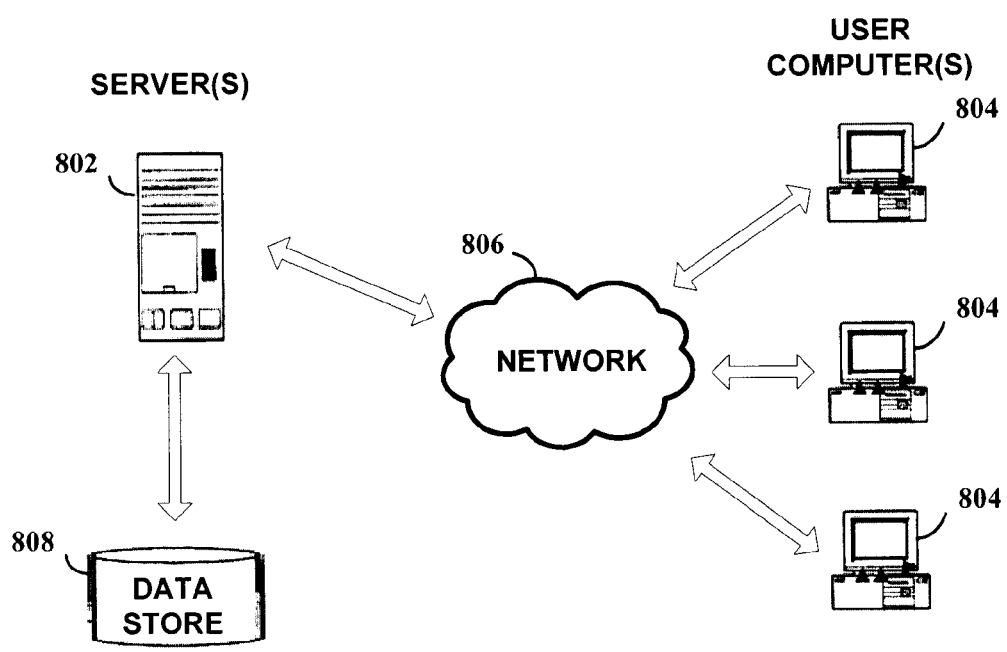
FIG. 8 illustrates some components that can be used in connection with one or more embodiments of the present disclosure.

FIG. 8 illustrates some components that can be used in connection with one or more embodiments of the present disclosure. In accordance with one or more embodiments of the present disclosure, one or more computing devices, e.g., one or more servers and/or user computing devices are configured to comprise functionality described herein. For example, one or more instances of computing device 802 can be configured to provide content together with a graphical user interface for displaying the content, e.g., content, segments of the content, and/or a summary of the content, and receiving user input indicative of a desire to create a content summary and/or a content segment, and creating a content segment and or a content summary in accordance with one or more embodiments of the present disclosure.

In accordance with one or more embodiments, server 802 can serve data, e.g., content, web pages, applets, etc., to user computing devices 804 using a browser application and a network 806. Data store 808 can be used to store data, including data served to a user computer 804, as well as data used by server 802, e.g., applications, drivers, etc. executed by the server 802.

The user computer 804 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 802 and user computer 804 can include one or more processors, memory, a removable media reader, network interface, display and interface, and one or more input devices, e.g., keyboard, keypad, mouse, etc. and input device interface, for example. One skilled in the art will recognize that server 802 and user computer 804 may be configured in many different ways and implemented using many different combinations of hardware, software, or firmware. A discussion of an internal architecture of a computing device is discussed further below.

In accordance with one or more embodiments, server 802 can make a user interface available to a user computer 804 via the network 806. The user interface made available to the user computer 804 can include content items, e.g., content, content segments, content summaries, etc., in accordance with one or more embodiments of the present disclosure. In accordance with one or more embodiments, server 802 makes a user interface available to a user computer 804 by communicating a definition of the user interface to the user computer 804 via the network 806. The user interface definition can be specified using any of a number of languages, including without limitation a markup language such as Hypertext Markup Language, scripts, applets and the like. The user interface definition can be processed by an application executing on the user computer 804, such as a browser application, to output the user interface on a display coupled, e.g., a display directly or indirectly connected, to the user computer 804.

In an embodiment, network 806 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 8. Alternatively, embodiments of the present disclosure can be implemented other environments, e.g., a peer-to-peer environment as one non-limiting example. In accordance with one or more embodiments, functionality provided by one or more of the embodiments discussed herein can be performed at server 802, user computer 804, or some combination of server 802 and user computer 804. By way of a non-limiting example, server 802 can serve content to user computer 804, and generate content segments and content summaries in response to indicators received from user computer 804. By way of a further non-limiting example, server 802 can be used to serve one or more of the content, content segments and content summaries and to maintain a database for use in identifying the content, content segments and content summaries. In such a case, server 802 can be configured to serve information, e.g., metadata associated with content segments, to a user computer 804, which is configured to generate a content summary. Server 802 can be configured to receive information from the user computer 804 that identifies the content summary created at the user computer 804, and to store such information. A user computer 804 can be configured to create a content segment, including collecting and associating the metadata to the content segment. By way of a further non-limiting example, while a database, or other data storage, used to maintain information about content, content segments and/or content summaries can reside at one or more of server 802, it can also reside at one or more of user computer 804.

Figure 9:
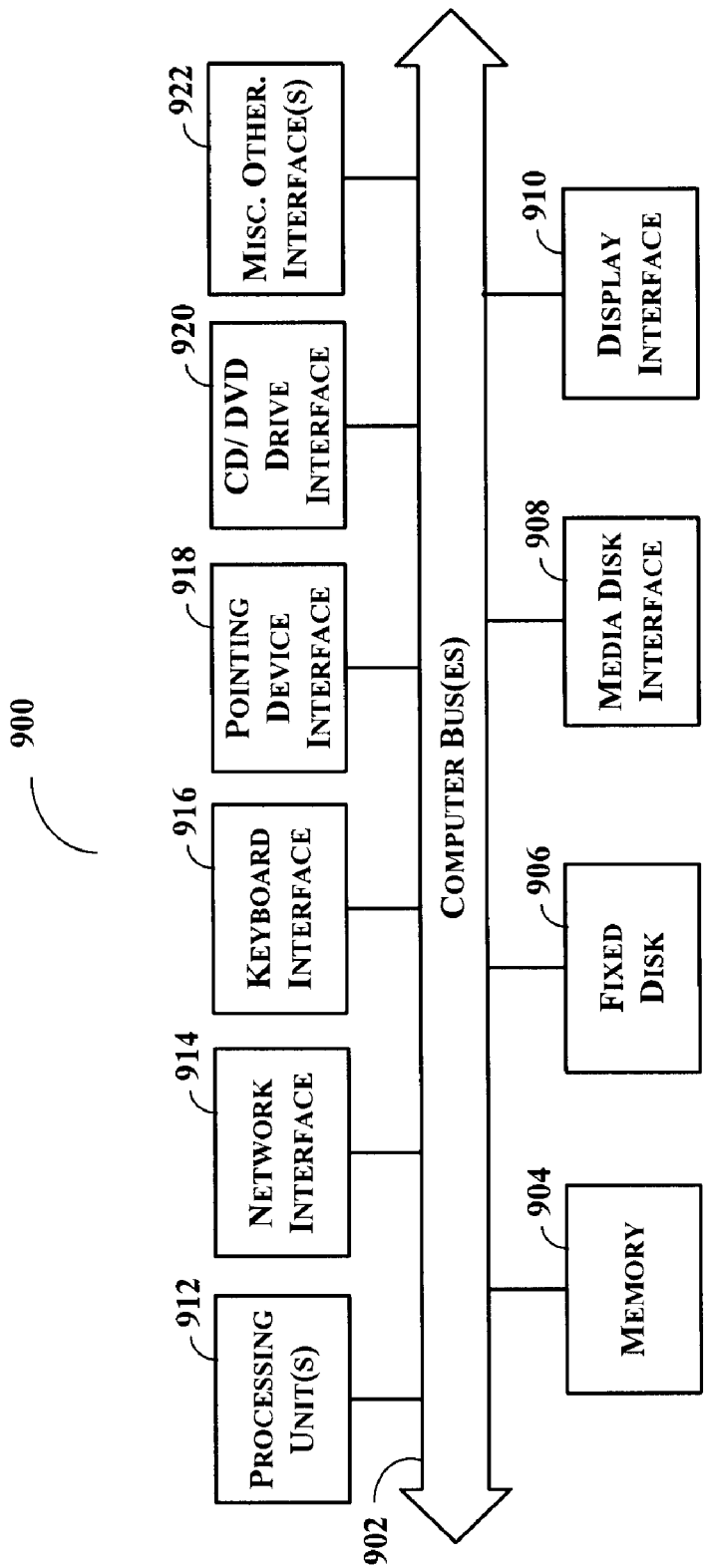
FIG. 9 is a detailed block diagram illustrating an internal architecture of a computing device in accordance with one or more embodiments of the present disclosure.

FIG. 9 is a detailed block diagram illustrating an internal architecture of a computing device, such as server 802 and/or user computing device 804, in accordance with one or more embodiments of the present disclosure. As shown in FIG. 9, internal architecture 900 includes one or more processing units (also referred to herein as CPUs) 912, which interface with at least one computer bus 902. Also interfacing with computer bus 902 are fixed disk 906, network interface 914, memory 904, e.g., random access memory (RAM), run-time transient memory, read only memory (ROM), etc., media disk drive interface 908 as an interface for a drive that can read and/or write to media including removable media such as floppy, CD-ROM, DVD, etc. media, display interface 910 as interface for a monitor or other display device, keyboard interface 916 as interface for a keyboard, pointing device interface 918 as an interface for a mouse or other pointing device, and miscellaneous other interfaces not shown individually, such as parallel and serial port interfaces, a universal serial bus (USB) interface, and the like.

Memory 904 interfaces with computer bus 902 so as to provide information stored in memory 904 to CPU 912 during execution of software programs such as an operating system, application programs, device drivers, and software modules that comprise program code, and/or computer-executable process steps, incorporating functionality described herein, e.g., one or more of process flows described herein. CPU 912 first loads computer-executable process steps from storage, e.g., memory 904, fixed disk 906, removable media drive, and/or other storage device. CPU 912 can then execute the stored process steps in order to execute the loaded computer-executable process steps. Stored data, e.g., data stored by a storage device, can be accessed by CPU 912 during the execution of computer-executable process steps.

Persistent storage, e.g., fixed disk 906, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., content segment creation module(s) and content summary creation module(s), the functionality and use of which in the implementation of the present disclosure are discussed in detail herein.

For the purposes of this disclosure a computer readable medium stores computer data, which data can include computer program code executable by a computer, in machine readable form. By way of example, and not limitation, a computer readable medium may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:

receiving, via at least one processing unit, input indicative of a starting point for a segment of a content stream, the content stream segment being a further content stream that is to be created from the content stream via a graphical user interface while the content stream is selected for playback by a media player in the graphical user interface;

receiving, via the at least one processing unit, input indicative of an ending point for the content stream segment;

receiving, via the at least one processing unit and while the content stream is selected for playback, at least one content summary selection property, the at least one content summary selection property for use in determining whether to include the content stream segment in a summary of the content stream, the summary being a summary content stream for playback and comprising one or more content stream segments;

creating, via the at least one processing unit and while the content stream is selected for playback, the content stream segment using the starting point and the ending point; and collecting, via the at least one processing unit, information as metadata to be associated with the content stream segment, the metadata comprising the at least one content summary selection property and including the starting point and the ending point of the content stream segment, wherein the at least one content summary selection property and one of the starting point and ending point are received via a single user interaction with an icon displayed in the graphical user interface of the media player's window.

2. The method of claim 1, the receiving the at least one content summary selection property further comprising:

receiving the at least one content summary selection property as input via the icon displayed in the graphical user interface of the media player's window, the icon being selectable in the graphical user interface to associate the at least one content summary selection property represented by the icon with the content stream segment.

3. The method of claim 2, wherein the icon comprises an acticon representing an action that occurs in the segment of content stream segment.

4. The method of claim 2, wherein the icon comprises an acticon selectable to indicate a user reaction to the content stream.

5. The method of claim 1, wherein the at least one content summary selection property comprises a rating information.

6. The method of claim 1, wherein the at least one content summary selection property comprises a comment.

7. The method of claim 1, wherein the content stream segment is one of a plurality of content stream segments having associated content summary selection properties, the method further comprising:
   in response to receiving a request for a summary of the content stream:
      selecting, by the at least one processing unit, the one or more content stream segments for inclusion in the summary of the content stream, the selecting comprising comparing information associated with the request with the content summary selection properties associated with the plurality of content stream segments to identify the one or more content stream segments; and
      providing the identified one or more content stream segments.

8. The method of claim 7, the providing the identified one or more content stream segments further comprising:
   representing, by the at least one processing unit, the identified one or more content stream segments as a list for display at a user computing device, each entry in the list corresponding to one of the identified one or more content stream segments and having an indicia selectable to indicate a desire to include the corresponding content stream segment in the content stream summary.

9. The method of claim 7, further comprising:
   determining a content stream segment length for a content stream segment being considered for inclusion in the content stream summary, the content stream segment length being determined using the content stream segment's starting point and ending point;
   using the content stream segment length, a current length of the content stream summary and a maximum length of the content stream summary to determine whether or not to select the content stream segment being considered for inclusion in the content stream summary.

10. The method of claim 1, wherein at least one of the starting point and the ending point is set by input received from the user.

11. The method of claim 1, wherein at least one of the starting point and the ending point is determined from the content stream.

12. A user interface displayed via a computing device, said user interface comprising:
   a media player portion to playback, via the computing device, a content stream summary, the content stream summary comprising one or more content stream segments of the content stream, each content stream segment being a further content stream created from the content stream, wherein the media player portion displays at least one icon to receive, via a single user interaction with the at least one icon, at least one content summary selection property and one of a starting point and ending point of the content stream segment;
   a content stream segment portion to display, via the computing device, information associated with one of the one or more content stream segments of the content stream summary;
   a content search portion comprising a search input section and a search results display portion, the search input section for entering search criteria to search, via the computing device, a content store for the content stream using the search criteria, and the search results display portion for displaying, via the computing device, results of the search; and
   a content segment list portion to display, via the computing device, one or more entries, each entry corresponding to one of the one or more content stream segments of the content stream in the content stream summary, each entry having at least one selection indicator selectable by a user to indicate whether or not to include the corresponding content stream segment in the content stream summary.

13. The user interface of claim 12, wherein at least one of the content segment portion and the content segment list portion comprising a ratings section to display a content segment rating.

14. The user interface of claim 12, wherein the at least one icon comprises an icon representing an action that occurs in a content stream segment of the one or more the content segments, the icon appearing in the user interface while the content stream segment is being played back to associate the action represented by the icon with the content stream segment being played back via the media player portion.

15. The user interface of claim 12, wherein the at least one icon comprises an icon displayed in the user interface and is selectable to indicate a user reaction to the content stream being played back via the media player portion.

16. A computer-readable medium tangibly storing thereon computer-executable process steps, the process steps comprising:
   receiving input indicative of a starting point for a segment of a content stream, the content stream segment, the content stream segment being a further content stream that is to be created from the content stream via a graphic user interface while the content stream is selected for playback by a media player in the graphical user interface;
   receiving input indicative of an ending point for the content stream segment;
   receiving, while the content stream is selected for playback, at least one content summary selection property, the at least one content summary selection property being for use in determining whether to include the content stream segment in a summary of the content stream, the summary being a summary content stream for playback and comprising one or more content stream segments;
   creating, while the content stream is selected for playback, the content stream segment using the starting point and the ending point; and
   collecting information as metadata to be associated with the content stream segment, the metadata comprising the at least one content summary selection property and including the starting point and the ending point of the content stream segment, wherein the at least one content summary selection property and one of the starting point and ending point are received via a single user interaction with an icon displayed in the graphical user interface of the media player's window.

17. The medium of claim 16, the process step of receiving the at least one content summary selection property further comprising:
receiving the at least one content summary selection property as input via the icon displayed in the graphical user interface of the media player's window, the icon being selectable in the graphical user interface to associate the at least one content summary selection property represented by the icon with the content stream segment.

18. The medium of claim 17, wherein the icon comprises an acticon representing an action that occurs in the content stream segment.

19. The medium of claim 17, wherein the icon comprises an acticon selectable to indicate a user reaction to the content stream.

20. The medium of claim 16, wherein the at least one content summary selection property comprises a rating information.

21. The medium of claim 16, wherein the at least one content summary selection property comprises a comment.

22. The medium of claim 16, wherein the content stream segment is one of a plurality of content stream segments having associated content summary selection properties, the process steps further comprising:
in response to receiving a request for a summary of the content stream:
selecting, the one or more content stream segments for inclusion in the summary of the content stream, the selecting comprising comparing information associated with the request with the content summary selection properties associated with the plurality of content segments to identify the one or more content stream segments; and
providing the identified content stream segments.

23. The medium of claim 22, the process step of providing the identified one or more content stream segments further comprising process steps of:
representing the identified one or more content segments as a list for display at a user computing device, each entry in the list corresponding to one of the identified one or more content stream segments and having anindicia selectable by the user to indicating a desire to include the corresponding content stream segment in the content stream summary.

24. The medium of claim 22, further comprising process steps of:
determining a content segment length for a content stream segment being considered for inclusion in the content stream summary, the content stream segment length being determined using the content stream segment's starting point and ending point;
using the content segment length, a current length of the content stream summary and a maximum length of the content stream summary to determine whether or not to select the content stream segment being considered for inclusion in the content stream summary.

25. The medium of claim 16, wherein at least one of the starting point and the ending point is set by input received from the user.

26. The medium of claim 16, wherein at least one of the starting point and the ending point is determined from the content stream.

27. A system comprising:
at least one computing device having a processing unit configured to:
receive input indicative of a starting point for a segment of a content stream, the content stream segment, the content stream segment being a further content stream that is to be created from the content stream via a graphical user interface while the content stream is selected for playback by a media player in the graphical user interface;
receive input indicative of an ending point for the content stream segment;
receive, while the content stream is selected for playback, at least one content summary selection property, the at least one content summary selection property being for use in determining whether to include the content stream segment in a summary of the content stream, the summary being a summary of the content stream for playback and comprising one or more content stream segments;
create, while the content stream is selected for playback the content stream segment using the starting point and the ending point; and
collect information as metadata to be associated with the content stream segment, the metadata comprising at least one content summary selection property and including the starting point and the ending point of the content stream segment, wherein the at least one content summary selection property and one of the starting point and ending point are received via a single user interaction with an icon displayed in the graphical user interface of the media player's window.

28. The system of claim 27, the at least one computing device configured to receive the at least one content summary selection property is further configured to:
receive the at least one content summary selection property as input via the icon displayed in a graphical user interface of the media player's window, the icon being selectable in the graphical user interface to associate the at least one content summary segment.

29. The system of claim 28, wherein the icon comprises an acticon representing an action that occurs in the content stream segment.

30. The system of claim 28, wherein the icon comprises an acticon selectable to indicate a user reaction to the content stream.

31. The system of claim 27, wherein the at least one content summary selection property comprises rating information.

32. The system of claim 27, wherein the at least one content summary selection property comprises a comment.

33. The system of claim 27, wherein the content stream segment is one of a plurality of content stream segments having associated content summary selection properties, the at least one computing device is further configured to:
in response to receiving a request for a summary of the content stream:
select the one or more of the content stream segments for inclusion in the summary of the content stream, the selecting comprising comparing information associated with the request with the content summary selection properties associated with the plurality of content stream segments to identify the one or more content stream segments; and
provide the identified one or more content stream segments.

34. The system of claim 33, the at least one computing device configured to provided the identified content segments is further configured to:
represent the identified one or more content stream segments as a list for display at a user computing device, each entry in the list corresponding to one of the identified one or more content stream segments and having an indicia selectable to indicate a desire to include the corresponding content stream segment in the content stream summary.

35. The system of claim 33, the at least one computing device is further configured to:

determine a content stream segment length for a content segment being considered for inclusion in the content summary, the content stream segment length being determined using the content stream segment's starting point and ending point;

use the content segment length, a current length of the content stream summary and a maximum length of the content stream summary to determine whether or not to select the content stream segment being considered for inclusion in the content stream summary.

36. The system of claim 27, wherein at least one of the starting point and the ending point is set by input received from the user.

37. The system of claim 27, wherein at least one of the starting point and the ending point is determined from the content stream.

* * * * *